US012101577B2

(12) United States Patent
Purnell et al.

(10) Patent No.: US 12,101,577 B2
(45) Date of Patent: Sep. 24, 2024

(54) SYSTEM FOR AUTOMATED AUDIO AND/OR VIDEO COMMUNICATION AND RELATED METHODS

(71) Applicant: Globalez Tech LLC, Kaysville, UT (US)

(72) Inventors: John D. Purnell, Bountiful, UT (US); Preston D. Purnell, Bountiful, UT (US)

(73) Assignee: Globalez Tech LLC, Kaysville, UT (US)

( * ) Notice: Subject to any disclaimer, the term of this patent is extended or adjusted under 35 U.S.C. 154(b) by 0 days.

(21) Appl. No.: 17/931,054

(22) Filed: Sep. 9, 2022

(65) Prior Publication Data

US 2023/0077712 A1 Mar. 16, 2023

Related U.S. Application Data

(60) Provisional application No. 63/261,101, filed on Sep. 10, 2021.

(51) Int. Cl.
*H04N 7/14* (2006.01)
*H04L 67/306* (2022.01)

(52) U.S. Cl.
CPC ........... *H04N 7/147* (2013.01); *H04L 67/306* (2013.01)

(58) Field of Classification Search
CPC .............................. H04N 7/147; H04L 67/306
See application file for complete search history.

(56) References Cited

U.S. PATENT DOCUMENTS

| 2013/0066992 A1* | 3/2013 | Ben-Yoseph | ........... H04L 67/54 709/206 |
| 2013/0162756 A1* | 6/2013 | Ellison | .................... H04L 65/80 370/260 |

OTHER PUBLICATIONS

International Search Report for International Application No. PCT/US2022/076235 dated Jan. 17, 2023, 2 pages.
International Written Opinion for International Application No. PCT/US2022/076235 dated Jan. 17, 2023, 9 pages.

* cited by examiner

*Primary Examiner* — Amal S Zenati
(74) *Attorney, Agent, or Firm* — TraskBritt

(57) ABSTRACT

A method for use in a video conference system may add a plurality of users to a group where each user is associated with a group identification indicator, designate a hub-user and one or more sub-users, automatically assign the one or more sub-users to one or more priority groups based, at least in part, on an identified familial relationship between the hub-user and the one or more sub-users, provide to a hub user on a display of a first communication device, an option to send a communication request, and send the communication request.

20 Claims, 11 Drawing Sheets

SYSTEM FOR AUTOMATED AUDIO AND/OR VIDEO COMMUNICATION AND RELATED METHODS

CROSS-REFERENCE TO RELATED APPLICATION

This application claims the benefit under 35 U.S.C. § 119(e) of the filing date of U.S. Provisional Patent Application Ser. No. 63/261,101, filed Sep. 10, 2021, for "SIMPLIFIED AND AUTOMATED AUDIO-VIDEO COMMUNICATION PROCESS FOR THE TECHNOLOGICALLY IMPAIRED," the disclosure of which is incorporated herein in its entirety by reference.

TECHNICAL FIELD

Embodiments of the present disclosure relate generally to methods and systems for video conferencing between two or more devices.

BACKGROUND

The internet has allowed forever increasing ways for people to connect with each other around the world. Computing devices such as desktops, tablets, and smartphones have allowed people to connect using both audio and video to allow for greater immersion and emotional connection across vast distances by simulating face to face interaction through audio and video signals.

BRIEF SUMMARY

Embodiments of the present disclosure include a method for initiating an audio and/or video communication session. The method may include adding a plurality of users to a group, each user of the plurality of users may be associated with a group identification indicator. The method may also include designating a hub-user and one or more sub-users from the plurality of users, automatically or manually assigning the one or more sub-users to one or more priority groups based, at least in part, on an identified familial relationship between the hub-user and the one or more sub-users, providing, to the hub-user for display on a first communication device, a selectable option to send an audio and/or video communication request to the one or more sub-users, sending an audio and/or video communication request to a sub-user of the one or more sub-users responsive to a selection to send an audio and/or video communication request to the one or more sub-users, wherein the sub-user is automatically selected to receive the audio and/or video communication request based, at least in part, on the assigned priority group of the sub-user and an indication that the sub-user is available to receive the communication.

Further embodiments of the present disclosure include a system. The system may include at least one processor, and at least one non-transitory computer-readable storage medium storing instructions thereon that, when executed by the at least one processor, cause the system to: add a plurality of users to a group, each user of the plurality of users associated with a group identification indicator, designate a hub-user and a plurality of sub-users from the plurality of users, assign the plurality of sub-users to a first priority group and a second priority group based, at least in part, on an identified relationship between the hub-user and each of the plurality of sub-users, wherein the first priority group has a higher priority than the second priority group, provide, to the hub-user for display on a first communication device, a selectable option to send an audio and/or video communication request to the plurality of sub-users, send an audio and/or video communication request to a sub-user assigned to the first priority group responsive to a selection to send an audio and/or video communication request to the one or more sub-users, automatically send successive audio and/or video communication requests to one or more subsequent sub-users in the first priority group responsive to a previous sub-user in the first priority group failing to accept the communication request within a predetermined period of time, and automatically send one or more successive audio and/or video communication requests to sub-users in the second priority group responsive to each of the sub-users in the first priority group failing to accept the audio and/or video communication request within a predetermined period of time or indicating that they are unavailable.

Further embodiments of the present disclosure may include a non-transitory computer-readable medium storing instructions thereon that, when executed by at least one processor, cause the processor to perform steps. The steps may include: adding a plurality of users to a group, each user of the plurality of users associated with a group identification indicator, designating a hub-user and one or more sub-users from the plurality of users, automatically assigning the one or more sub-users to one or more priority groups based, at least in part, on an identified familial relationship between the hub-user and the one or more sub-users, providing, to the hub-user for display on a first communication device, a selectable option to send an audio and/or video communication request to the one or more sub-users, sending an audio and/or video communication request to a sub-user of the one or more sub-users responsive to a selection to send an audio and/or video communication request to the one or more sub-users, wherein the sub-user is automatically selected to receive the communication request based, at least in part, on the assigned priority group of the sub-user and an indication that the sub-user is available to receive the communication.

BRIEF DESCRIPTION OF THE SEVERAL VIEWS OF THE DRAWINGS

Various embodiments will be described and explained with additional specificity and detail through the use of the accompanying drawings in which.

DETAILED DESCRIPTION

Figure 1:
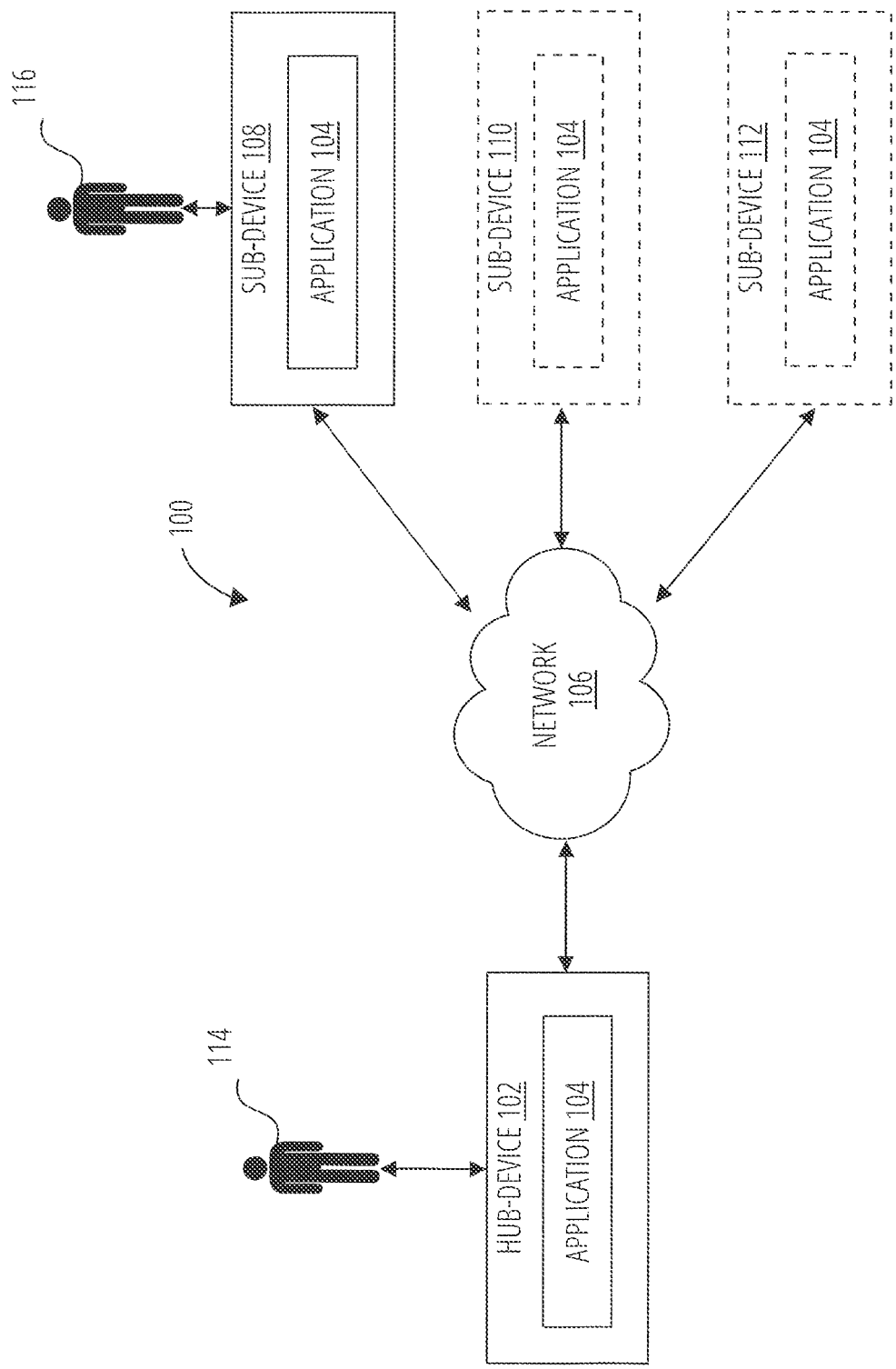
FIG. 1 illustrates a schematic representation of an environment within which a video conference system can operate in accordance with one or more embodiments of the present disclosure.

The illustrations presented herein are not actual views of any particular video conference system, or any component thereof, but are merely idealized representations, which are employed to describe the present invention.

As used herein, a "video conference system" may describe any system that allows audio and/or video signals to be transmitted between two or more devices.

Video conferencing, also known as video telephony, typically involves a combined transmission of audio and video signals between two or more people in order to simulate real time face-to-face interactions. As technology has advanced, video conferencing has become increasingly available on many different types of platforms including desktops, laptops, tablets, and smartphones. Accordingly, more people than ever are able to access and use video conferencing technology. As audio/video communication has progressed technologically, the sophistication of the systems has increased offering more options and settings than ever before for connecting with others. However, this increase in sophistication has also led to increased demands of technical competence from users, which has made using audio/video communication technology increasingly difficult and intimidating for some users.

For example, senior citizens are often limited in their physical mobility and must increasingly rely on remote forms of communication, such as video conferencing, in order to keep in touch with close friends or family members. Video conferencing offers several benefits for seniors to be able to keep in touch with loved ones. For example, video conferencing offers seniors a way to speak to and see their loved ones without the need to move great distances or to travel, which may be impossible for some. Moreover, as a senior ages, their hearing may decline to the point where they may be forced to increasingly rely on being able to see a person's face to read their lips in order for them to effectively communicate. However, as video conferencing technology has increased in sophistication, many seniors find themselves left behind in their understanding of modern interfaces and are often confused or frustrated by not knowing how to operate a modern interface. As a result, many senior citizens are unable to initiate contact with their close friends or relatives and, even if contacted by them, may be unable to navigate the relatively complex modem interfaces in order to accept the call. This problem only grows greater as the senior ages and their cognitive or physical abilities begin to decline to the point where the senior citizen may be unable or unwilling to interact with modem video conference system interfaces at all, leaving them unable to engage in video conferencing with loved ones.

Furthermore, in some cases, video conferencing may be the only option for a senior citizen or someone who is disabled to communicate with others. What's more, if a senior citizen is living in an assisted living facility or if they live alone, the inability to communicate with loved ones may lead to overwhelming feelings of loneliness and despair. Moreover, family members who live too far away to make regular visits may be completely unable to check in on their aging family member due to the inability of the aging family member to place or answer calls due to the complexity of modem interfaces. This may lead to further anxiety and worry about a senior citizen's physical or mental condition by concerned loved ones.

Accordingly, one or more embodiments of the present disclosure include a simplified video conferencing system for enabling a user (e.g., a designated hub-user) to automatically send successive audio and/or video connection requests to one or more related users (e.g., designated sub-users) until a connection is made with a related user or until each related user has received an audio and/or video connection request. For example, the simplified video conferencing system may allow a hub-user to use a video conferencing application that presents a simplified interface such that a single interaction with the simplified interface by the hub-user will successively attempt a video conference call with one or more users designated as part of a group including the hub-user. This system may offer a hub-user with limited physical or mental capacity easier access to communication technology without the need for complicated interfaces of conventional systems. Moreover, the system may also enable the one or more users to remotely control one or more audio and/or video settings of the hub-user to further relieve the cognitive burden of participating in a video conference call from the hub-user.

Because the video conferencing system of the present disclosure enables a user to connect with one or more other users responsive to a single interaction with the video conferencing system by the hub-user, the video conferencing system is advantageous over conventional video conferencing systems. For instance, because of the video conferencing system allows for video conference calling using a simplified interface for a hub-user, the computational load of operating the video conference system 100 on a hub-device is reduced in comparison to conventional systems. In other words, the video conference system of the present disclosure results in less required processing power to operate on a device in comparison to conventional systems. As a result, the video conference system of the present disclosure may be a more appropriate system for mobile devices than conventional systems.

Moreover, because the video conference system can operate on a hub-device using a simplified interface, the video conference system is accessible to more users, allowing more users to operate the video conference system in comparison to conventional systems. Furthermore, the video conference system removes steps typically necessary for making a series of audio and/or video requests of a plurality of users. For instance, the video conference system automatically cycles through sending communication requests to a group of users associated with a hub user until a request is accepted. As a result, the video conference system does not require a substantial amount of information or interaction from a user unlike conventional systems. Thus, the video conference system provides quicker access to communication capabilities in comparison to conventional systems. Likewise, the simplified interface allows for easier navigation by a user.

FIG. 1 illustrates a schematic diagram of an environment 100 in which a video conferencing system can operate according to one or more embodiments of the present disclosure. As illustrated, the environment 100 includes a hub-device 102 and a sub-device 108 which may communicate with the hub-device 102 via a network 106. As illustrated in FIG. 1, a hub-user 114 may interface with the hub-device 102, for example, to initiate communication with sub-device 108, which may, in turn, be interfaced by a sub-user 116. Hub-user 114 and sub-user 116 may be individuals (i.e., human users), a business, a group, or any other entity.

In some embodiments, hub-device 102 and sub-device 108 may include an application 104 installed thereon. The application 104 may facilitate audio and/or video communication between the hub-device 102 and the sub-device 108 (e.g., via network 106). In particular, the hub-device 102 and the sub-device 108 may execute one or more applications (e.g., application 104) for performing the functions of the various embodiments and processes described herein. For example, in some instances, the application 104 may be a video conference application configured to establish audio and/or video connection between two or more users (e.g., between the hub-user 114 and the sub-user 116). In some embodiments, the application 104 may include a video conferencing application or a video conferencing application within a social media application. In additional embodiments, the application 104 may include a skill and/or application of a smart speaker or within a cloud computing device. In further embodiments, the application 104 may be a web browser or email provider application. In yet further embodiments, the application 104 may include an electronic messaging application (e.g., a messenger, a chat application, a text messenger, etc.) In some embodiments, the application 104 may be local to each of the hub-device 102 and the sub-device 108. In other embodiments, the application 104 may be stored and/or at least partially operated via a cloud computing service. In one or more embodiments, as is discussed in greater detail in regard to FIG. 2, the application 104 of the hub-device 102 or the sub-device 108 enables communication between (e.g., sending and receiving audio and/or video streams) the hub-device 102 and the sub-device 108 of the video conferencing system via the network 106.

In some embodiments, the application 104 may provide to a device (e.g., the hub-device 102 and/or the sub-device 108) a Graphical User Interface (GUI) to be presented on a display of the device. The GUI may display to a user various options for interacting with the application 104. For example, the GUI may be configured to present to a user one or more options and/or settings pertaining to audio and/or video signals. For example, the GUI may include selectable elements that, when selected by a user, change one or more states of the GUI, initiates or manipulates an audio and/or video signal sent or received by the device, or changes one or more settings with regard to other users. Various elements of the GUI included in the application 104 are discussed in more detail below with regard to FIGS. 3-9.

In one or more embodiments, the application 104 may be a native application installed on each of the hub-device 102 and the sub-device 108. For example, the application 104 may be a mobile application that installs and runs on a mobile device, such as a smart phone or a tablet. In some embodiments, the application 104 facilitates the capture of audio and/or video information at each of the hub-device 102 and the sub-device 108 using, for example, a microphone and/or video camera included within each of the hub-device 102 and the sub-device 108. The application 104 may be a video conference application that is native to the hub-device 102 or the sub-device 108 and/or specific to an operating system of the hub-device 102 or the sub-device 108. Alternatively, the application 104 may be a client application that is associated with the video conference system 100 and configured to facilitate audio and/or video communication between one or more devices through the application 104.

The application 104 of the hub-device 102 and the application 104 of the sub-device 108 may communicate via the network 106. The network 106 may include one or more networks, such as the Internet, and can use one or more communication platforms or technologies suitable for transmitting data and/or communication signals. Although FIG. 1 illustrates a particular arrangement of the hub-device 102, the sub-device 108, and the network 106, various additional arrangements are possible. For example, the sub-device 108 can directly communicate with the hub-device 102, bypassing the network 106. In one or more embodiments, the network 106 includes a combination of cellular or mobile telecommunications networks, a public switched telephone network (PSTN), and/or the Internet or World Wide Web and facilitates the transmission of audio and/or video signals between the hub-device 102 and the sub-device 108. The network 106, however, may include various other types of networks that use various communication technologies and protocols, such as a local area network (LAN) (e.g., a wired local area network), a wireless local network (WLAN), a wide area network (WAN), a metropolitan area network (MAN), other telecommunication networks, or a combination of two or more of the foregoing networks.

The hub-device 102 and/or the sub-device 108 may be any one or more of various types of computing devices. For example, the hub-device 102 and/or the sub-device 108 may include a mobile device such as a mobile telephone, a smartphone, a PDA, a tablet, a laptop, a smart speaker, or a non-mobile device such as a desktop or other type of computing device. Additional details with respect to the hub-device 102 and/or the sub-device are discussed below with respect to FIG. 8.

Although the hub-device 102 is discussed as communicating with sub-device 108, FIG. 1 shows that the video conference system 100 may be configured to enable a plurality of devices to communicate audio and/or video signals between each other. For instance, the hub-device 102, sub-device 108, sub-device 110, and/or sub-device 112 may each be in audio and/or video communication with each other simultaneously where each device may include application 104 to transmit and receive audio and/or video signals between each device of the video conference system 100.

Figure 2:
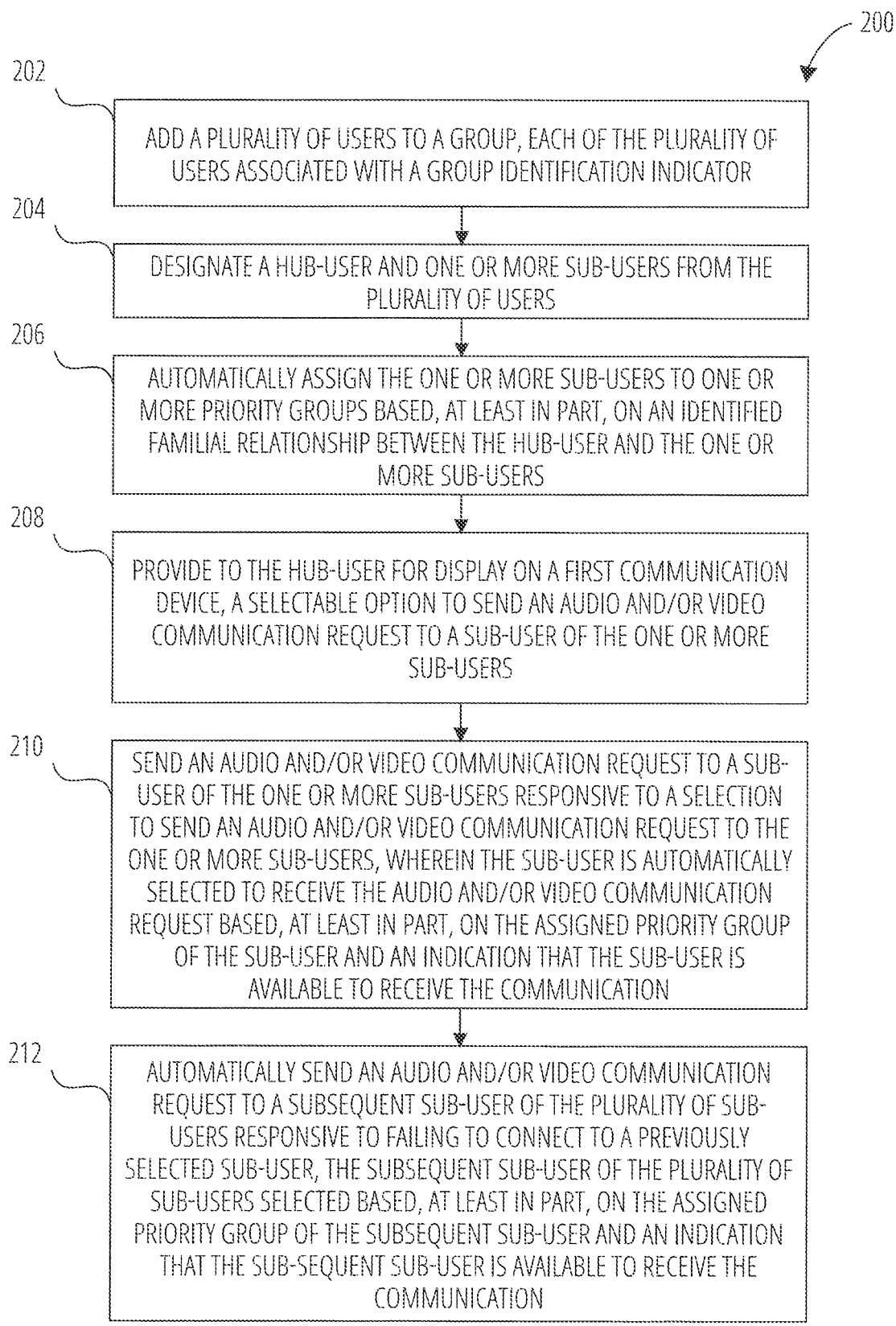
FIG. 2 is a flowchart illustrating an operation of the video conference system performed by a processor executing instructions stored on a computer-readable medium according to one or more embodiments of the present disclosure.

FIG. 2 is a flowchart illustrating an operation of the video conference system 100 performed by one or more processors executing instructions stored on a computer-readable storage medium. At operation 202, the video conference system 100 adds a plurality of users to a group where each of the plurality of users is associated with a group identification indicator that may be unique to the group. For example, one or more users (e.g., hub-user 114 and/or sub-user 116) may, via application 104, join a group upon receiving an invite or inputting a group code. Upon accepting the invite or inputting the group code, a user may be added to a group where the group code is associated with each user that belongs to the group. As a specific example, application 104 may allow a user to create a personal profile that contains various details about the user (discussed in more detail with regard to FIG. 5 below). After the user has created a profile, the user may join or create a group in order to be associated with other users using the application 104 (discussed in more detail with regard to FIG. 7). When a group is created, a group code is generated that serves as identification for the group. Other users may then, via application 104, join the group by entering in the group identification code (e.g., the group ID number that was generated upon creation of the group), which may cause the user who entered the code to become a member of the group and be associated with the group identification code. After a user is associated with a group identification code, the user may have access to the group such that the user may view or otherwise engage with the profiles of other users in the group.

At operation 204, the video conference system 100 may designate a hub-user (e.g., hub-user 114) and one or more sub-users (e.g., sub-user 116) from the plurality of users in the group. Additionally, in some embodiments the user that created the group is automatically assigned as the administrator or "admin" of that group. The admin may designate a member of the group to be a hub-user (e.g., hub-user 114) and the rest of the users, including the admin user, may be sub-users. In some embodiments, upon designating a hub-user, the other members in the group of which the hub-user is a member will automatically be designated as sub-users.

In some embodiments, the application on the designated hub-device 102 may have different functionality compared with the other users (e.g., the sub-users). Furthermore, the hub-user may also have a different GUI displayed via the hub-device 102 compared to the GUI presented to the sub-users via the sub-user devices (e.g., sub-device 108). For example, in some embodiments the GUI presented to the hub-user may display a single interactive element to place successive calls to each member of the group of which the hub-user is a member (e.g., the other members of the group of which the hub-user is also a member) whereas, in some embodiments, no such option may be presented to the GUI presented to the sub-users via the sub-devices. Moreover, in some examples the GUI presented to the hub-user may display an interactive element to place a call to a member of the hub-user's group as well as an interactive list showing all of the members of the hub-user's group.

At operation 206, the video conference system 100 may automatically assign the one or more sub-users to one or more priority groups based, at least in part, on an identified priority indicator of the sub-user. In some embodiments, the identified priority indicator of the sub-user may be an indication of a familial relationship between the hub-user and the sub-user. For example, upon designating a hub-user or upon joining a group with a designated hub-user, a sub-user may be prompted to designate their relationship with the hub-user. As a specific non-limiting example, a sub-user may be presented via a GUI an option to select an indication of the sub-user's familial relation with the hub-user from a predetermined list of relations (e.g., spouse, child, grandchild, great-grandchild, etc.). Each priority group may have a corresponding priority level. For instance, the "child" priority group may have a higher priority than the "grandchild" priority group, which may in turn have a higher priority than the "great-grandchild" group and so on. Though discussed in terms of family relationships, one of ordinary skill in the art will appreciate that any method of assigning priority to a priority group may be used.

In some embodiments, each sub-user may be placed in a hierarchical tree structure where the hub-user is the root of the tree structure. In this example, each sub-user would be added to the hierarchical tree structure according to their priority indicator. Furthermore, each level of the tree structure would represent a priority group where the nodes of the tree that are closer to the root node may have a higher priority value. For example, the sub-users who designate themselves as a child of the hub-user would be added to the tree structure as children nodes of the root node. Next, any sub-users who designate themselves as grandchildren would then be placed into the tree structure as child nodes to the previously added nodes, and so on.

Additionally, each sub-user of a priority group may also be assigned a priority level within that group. For example, each sub-user identified as a child of the hub-user may be assigned a priority level within the "child" priority group. In some embodiments, sub-users within a priority group may be assigned priority within that group based on when the sub-user was added to the priority group. For example, upon a sub-user being assigned to the "child" priority group already having three other sub-users already within that group may be assigned a priority level of "4," indicating that the newly added sub-user has the fourth highest priority level in the group. Though discussed in terms of when a sub-user is added to a priority group, one of ordinary skill in the art will appreciate that any method of assigning priority to the sub-users of a priority group may be used. As additional non-limiting examples, sub-users within a priority group may be assigned priority within that priority group based on one or more of age, distance that sub-user lives from the hub-user, date added to the priority group, a manually assigned priority indicator, alphabetical order of the sub-user's name, or admin status.

At operation 208, the video conference system 100 may provide, to the hub-user for display on a first communication device, a selectable option to send an audio and/or video communication request to a sub-user of the one or more sub-users. For example, in some embodiments the video conference system 100 may provide to a display included in hub-device 102 a GUI showing a single large interactive element (discussed in more detail below with regard to FIG. 3) via the application 104 of the hub-device 102. The interactive element may indicate that a selection of the interactive element by a user will initiate a call to the members of the group of which the hub-user 114 is a member. In some embodiments, the video conference system 100 may provide to a display included in hub-device 102 a GUI showing a large interactive element as well as a list of the sub-users. For example, in some embodiments the GUI provided to the display of the hub-device 102 shows, on the left half of the GUI, the large interactive element while the right side of the GUI shows the list of sub-users. In some embodiments, the list of sub-users may include a list of card elements showing details of each sub-user derived from each sub-user profile. For example, each card element in the list of sub-user card elements may show one or more of a selected profile picture, name, relationship to the hub-user 114, and availability. Moreover, each card element of the list of card elements may themselves be an interactive element that, when selected, performs an action with relation to the selected sub-user card (e.g., showing additional profile information and/or sending an audio and/or video communication request to the selected sub-user). Furthermore, the video conference system 100 may exclude one or more sub-users from the list of sub-users displayed via the hub-device 102 based on an indicated availability of that sub-user. For example, when creating their profile, a sub-user may select times of the day and/or week that the sub-user is available or unavailable to receive call requests from the hub-user. Furthermore, a sub-user may subsequently change their availability settings. This functionality is discussed in more detail below with regard to FIG. 8. Accordingly, if a sub-user indicates that they are unavailable via their profile, that sub-user will be excluded from the list shown to the hub-user.

At operation 210, the video conference system 100 may send an audio and/or video communication request to a sub-user of the one or more sub-users responsive to a selection to send an audio and/or video communication request to the one or more sub-users, wherein the sub-user is selected to receive the audio and/or video communication request based, at least in part, on the assigned priority group of the sub-user and an indication that the sub-user is available to receive the communication. For example, a hub-user 114 may select, via the hub-device 102, the large selectable element displayed via the GUI on the display of the hub-device 102. This selection may cause the video conference system 100 to send an audio and/or video communication request to one or more sub-users (e.g., sub-user 116) that are in the same group as the hub-user 114 based on the priority group of the sub-user and whether or not the sub-user is available. For example, upon selection of the option to send an audio and/or video request via the hub-device 102, the video conference system 100 may, via application 104 of the hub-device 102, automatically select a sub-user in the highest priority group that has indicated that they are available. Moreover, in some embodiments, the video conference system 100 may, via application 104 of the hub-device 102, select a sub-user 116 within a priority group based on an additional indication of priority of a sub-user. In other embodiments, the video conference system 100 may, via application 104 of the hub-device 102, randomly select a sub-user within a priority group.

Additionally, upon selection of a sub-user (e.g., sub-user 116), the video conference system 100 may then provide to the selected sub-user (e.g., sub-user 116) for display on a second communication device (e.g., sub-device 108), a selectable option to accept the audio and/or video communication request sent by the hub-user 114 via network 106. The selected sub-user may then select the provided communication request to initiate audio and/or video communication between the hub-user 114 and a selected sub-user. Audio and/or video signals may then be sent back and forth between the hub-user 114 and the selected sub-user via network 106.

In some embodiments, upon initiation of audio and/or video communication from any sub-user or between the hub-user 114 and the selected sub-user, the video conference system 100 may automatically enable a first audio communication device (e.g., a microphone) of the hub-device 102 and a second audio communication device of a second device (e.g., the sub-device 108). The video conference system 100 may also enable a first video communication device (e.g., a video camera) of the hub-user's 114 device 102 and a second video communication device of the second communication device. In some embodiments, the video conference system 100 may, upon initiation of an audio and/or video communication, enable the second video communication device and not the first video communication device. Stated another way, in the case that audio and video communication has been initiated between the hub-device 102 and the sub-device 108, the video conference system 100 may enable an audio device of the hub-device 102 as well as an audio device of the sub-device 108, but may enable a video device of the sub-device 108, but not enable a video device of the hub-device 102. In this example, the video device of the hub-device 102 will remain disabled until manually enabled by the hub-user 114 via the hub-device 102, or by the sub-user 116 by sending a control signal from the sub-device 108 over network 106 to the hub-device 102.

As an illustrative non-limiting example, sub-user 116 may, via sub-device 108, send an audio and/or video communication request to the hub-user 114 to be displayed on a display of hub-device 102. In some embodiments, when sub-user 116 sends an audio and/or video communication request to the hub-user 114, the video conference system 100 may enable audio communication between the hub-device 102 and the sub-device 108 over network 106. For example, upon receiving an audio and/or video communication request, the video conference system 100 may enable a microphone device and a speaker device that are part of or operatively connected to the hub-device 102 as well as a microphone device and a speaker device that are part of or operatively connected to the sub-device 108 to allow for audio signals to be received and transmitted over network 106 between the hub-device 102 and the sub-device 108. In some embodiments, audio communication between the hub-device 102 and the sub-device 108 may be enabled for a predetermined amount of time. For example, audio communication may be enabled while the audio and/or video communication request is active and then disabled when the audio and/or video communication request is deactivated.

Furthermore, upon receiving the audio and/or video request from the sub-user 116, the hub-device 102 may display, via a display of the hub-device 102, live video streamed via a video device that is part of or operatively connected to the sub-device 108 where the live video is communicated to the hub-device 102 over network 106. The hub-user 114 may then select to accept the audio and/or video communication request to automatically enable a video device that is part of or operatively connected to the hub-device 102 and communicate live video streamed via the video device of the hub-device 102 to the sub-device 108 over network 106. In some embodiments, the sub-user 116 may be able to remotely enable and/or disable the video device that is part of or operatively connected to the hub-device 102.

Furthermore, upon initiation of audio and/or video communication between the hub-user 114 and the selected sub-user, the video conference system 100 may send one or more audio and/or video communication request to one or more additional sub-users and initiate audio and/or video communication between hub-user 114, the selected sub-user, and the one or more additional sub-users responsive to one or more additional sub-users accepting the one or more audio and/or video communication requests. For example, when hub-user 114 has entered into audio and/or video communication with the selected sub-user, the selected sub-user (e.g., sub-user 116) may be provided, via the display of the second communication device (e.g., sub-device 108), with an option to add additional users to the audio and/or video communication session that the hub-user 114 and the selected sub-user are in. Upon selection by the selected sub-user to add additional users, the selected sub-user may then be presented with a list of additional sub-users that are in the same group as the hub-user 114 and the selected sub-user. The selected sub-user 116 may then select one or more of the additional sub-users and an audio and/or video request may be sent to the each of the one or more additional sub-users selected by the selected sub-user. The one or more additional sub-users may then enter into audio and/or video communication with each member of the communication session via network 106 by accepting the audio and/or video request.

At operation 212, the video conference system 100 may automatically send an audio and/or video communication request to a subsequent sub-user of the plurality of sub-users (e.g., the sub-users in the same group as the hub-user 114) responsive to failing to connect to a previously selected sub-user where the subsequent sub-user of the plurality of sub-users is selected based, at least in part, on the assigned priority group of the subsequent sub-user and an indication that the subsequent sub-user is available to receive the communication. For example, if an initial audio and/or video communication request to an initial selected sub-user is not accepted within a predetermined amount of time, the video conference system 100 may automatically discontinue the current audio and/or video communication request and send a subsequent audio and/or video communication request to another sub-user according to the priority group of the remaining sub-users. This process may be repeated until each sub-user in each priority group has been contacted or until a sub-user accepts an audio and/or video communication request.

If the video conference system 100 has sent an audio and/or video communication request to each available sub-user in each priority group and no sub-user has accepted the request, the video conference system 100 may begin the process again and automatically send an audio and/or video communication request to the first selected sub-user again and repeat the cycle a predetermined number of times. For example, a sub-user designated as the admin of the group containing the hub-user and the plurality of sub-users may specify how many times a hub-user can cycle through each available sub-user before the video conference system 100 ceases to send audio and/or video communication requests.

As an illustrative non-limiting example, if there are three priority groups, the first highest priority group having two sub-users, the second highest priority group having one sub-user, and the third priority group having three sub-users, the video conference system 100 may, responsive to a selection by the hub-user to send an audio and/or video communication request to members of the hub-user's group, select an initial sub-user (e.g., sub-user 116) from the first highest priority group. The initial sub-user may be selected from the first highest priority group either randomly or according to a priority indicator. If the initial sub-user does not accept the request within a predetermined amount of time, the video conference system 100 may revoke the request and automatically select another sub-user from the first highest priority group that is available. For instance, the first highest priority group having only two members will select the other sub-user in the first highest priority group if that sub-user indicates that they are available. If no sub-users in the highest priority group are available or no sub-user accepts the request, the video conference system 100 will then select a sub-user from the second highest priority group. This process may repeat until each available sub-user of each priority group has received a request. If no request is accepted, the video conference system 100 may again send a request to a sub-user in the first highest priority group and the process will repeat for a predetermined amount of times. In some embodiments, after the video conference system 100 has completed a cycle of sending an audio and/or video request to each available sub-user of each priority group, upon the next cycle, the video conference system 100 may modify one or more selection rules. For example, if the video conference system 100 previously selected sub-users within each priority group randomly, on the next iteration the video conference system 100 may select sub-users within each priority group according to a predetermined selection order.

FIGS. 3-10 illustrate a collection of user interfaces including features of the video conference system 100 according to one or more embodiments of the present disclosure. In particular, the user interfaces show features of the video conference system 100. As will be described in more detail below, the components of the video conference GUI of the video conference system 100 as described in regard to FIGS. 1-2 can provide, along and/or in combination with the other components, one or more graphical user interfaces ("GUIs"). In particular, the components can allow a hub-user (e.g., hub-user 114) to connect with (e.g., send and receive audio and/or video signals) a sub-user (e.g., sub-user 116). For instance, FIGS. 3-10 and the description that follows illustrate various example embodiments of the user interfaces and features that are in accordance with one or more embodiments of the present disclosure.

Figure 3:
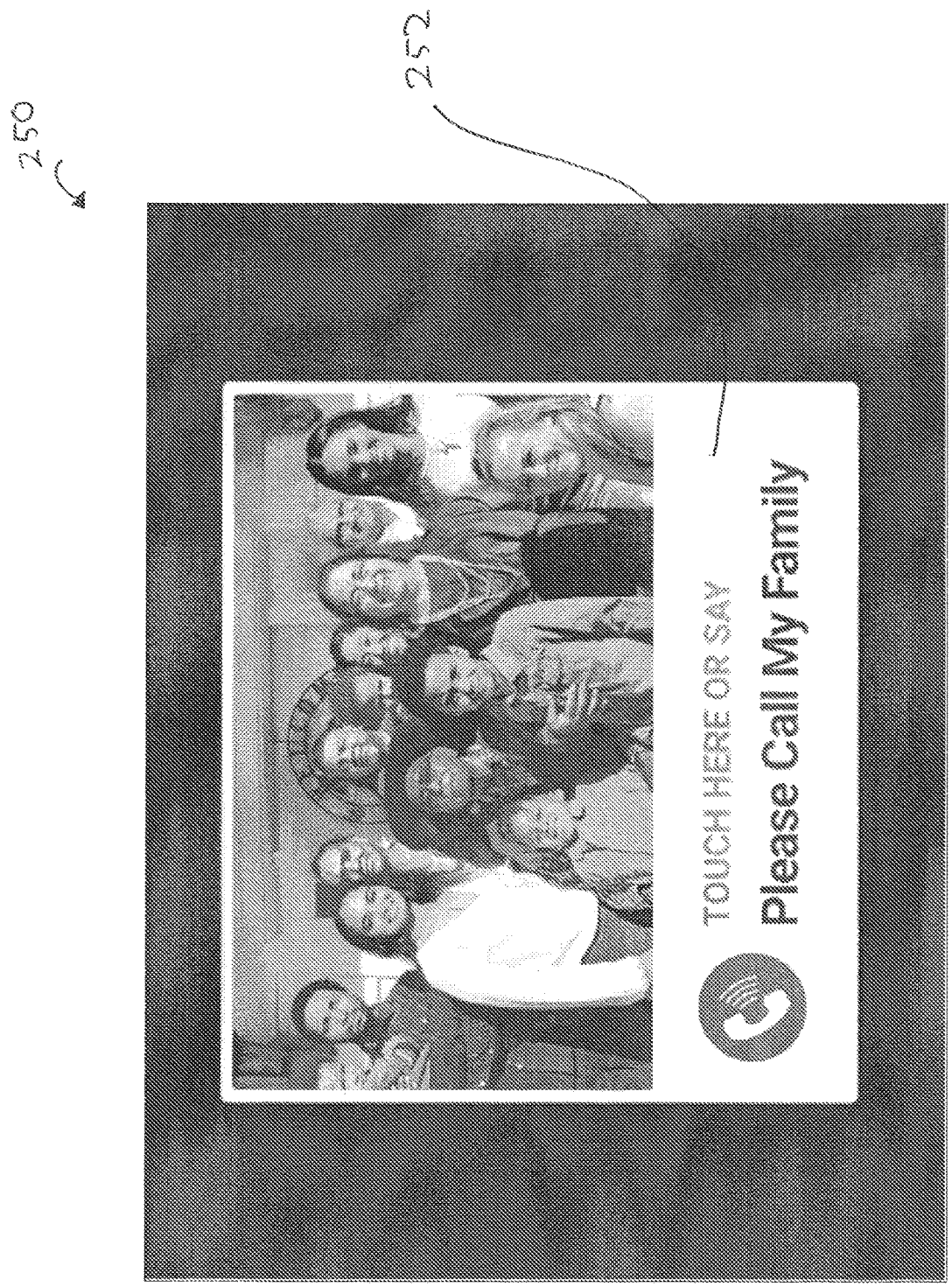
FIG. 3 illustrates a schematic representation of a graphical user interface of the video conference system for enabling a hub-user to connect with a sub-user.

For example, FIG. 3 illustrates a GUI that may be presented by application 104 via a communication device such as hub-device 102. For purposes of the present disclosure, the communication devices discussed herein may be a device used by a hub-user or a sub-user. In some embodiments, the communication device is a handheld device, such as a tablet device or a smart phone device, however, any other suitable computing device, such as, but not limited to, a laptop or desktop computer, a personal digital assistant device, and/or any other suitable computing device can perform one or more of the processes and/or operations described herein.

In some embodiments, a communication device such as a hub-device 102 or sub-devices 108-112 may include a touch screen display that can display a GUI. Furthermore, a communication device may receive and/or detect user inputs via a touch screen display. In other embodiments, the user may interact with a communication device with a mouse and keyboard or any other input device such that a user is able to select various selectable elements displayed via the GUI.

As shown in FIG. 3, a GUI 250 may present a simplified video conference interface to a communication device (e.g., hub-device 102). GUI 250 may include a selectable element 252 that, when selected by a user (e.g., hub-user 114), may cause the application 104 of video conference system 100 to automatically select a sub-user (e.g., sub-user 116) and send an audio and/or video communication request to the selected sub-user via network 106 as described above in FIG. 2.

Figure 4:
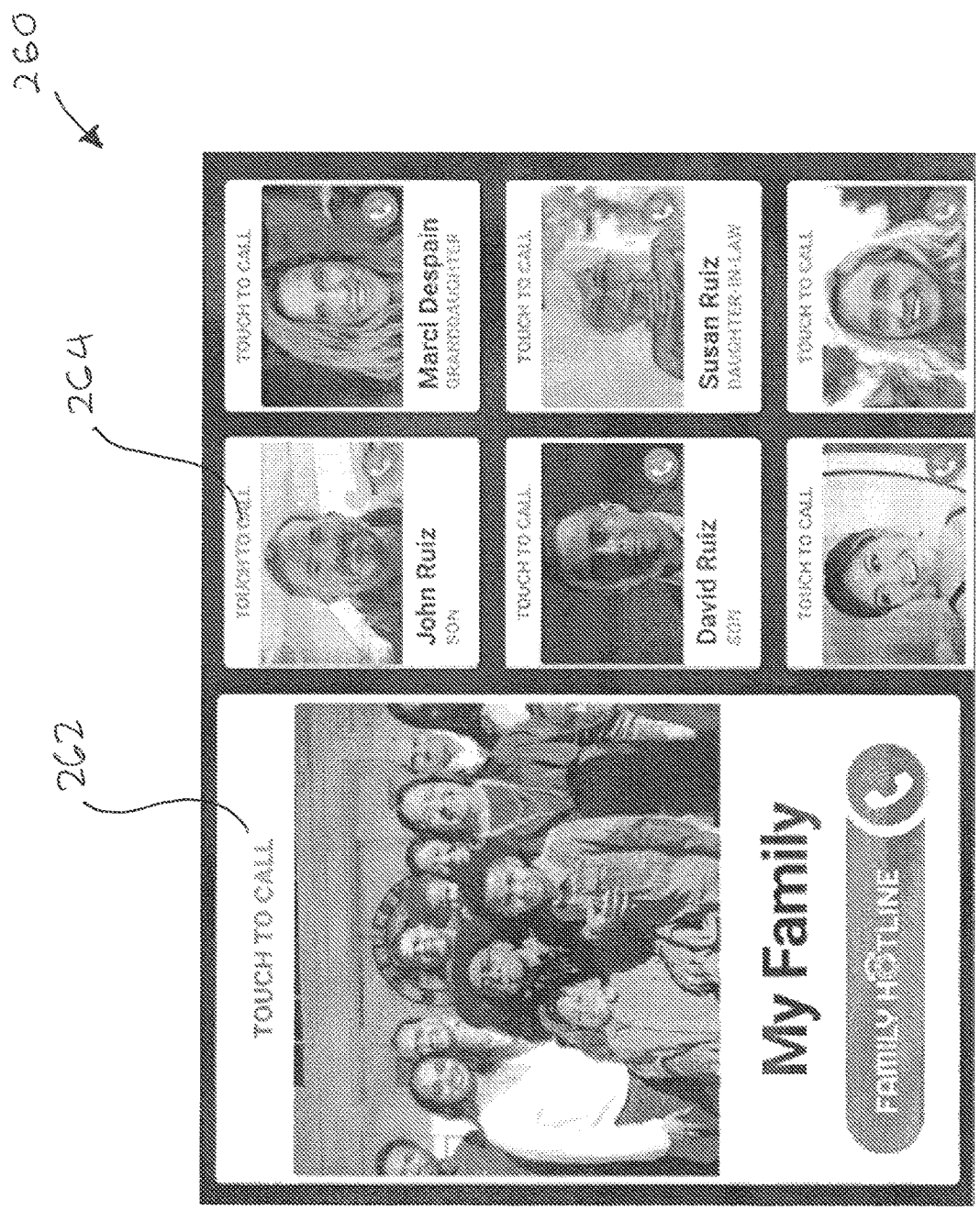
FIG. 4 illustrates another schematic representation of a graphical user interface of the video conference system for enabling a hub-user to connect with a sub-user.
Figure 10:
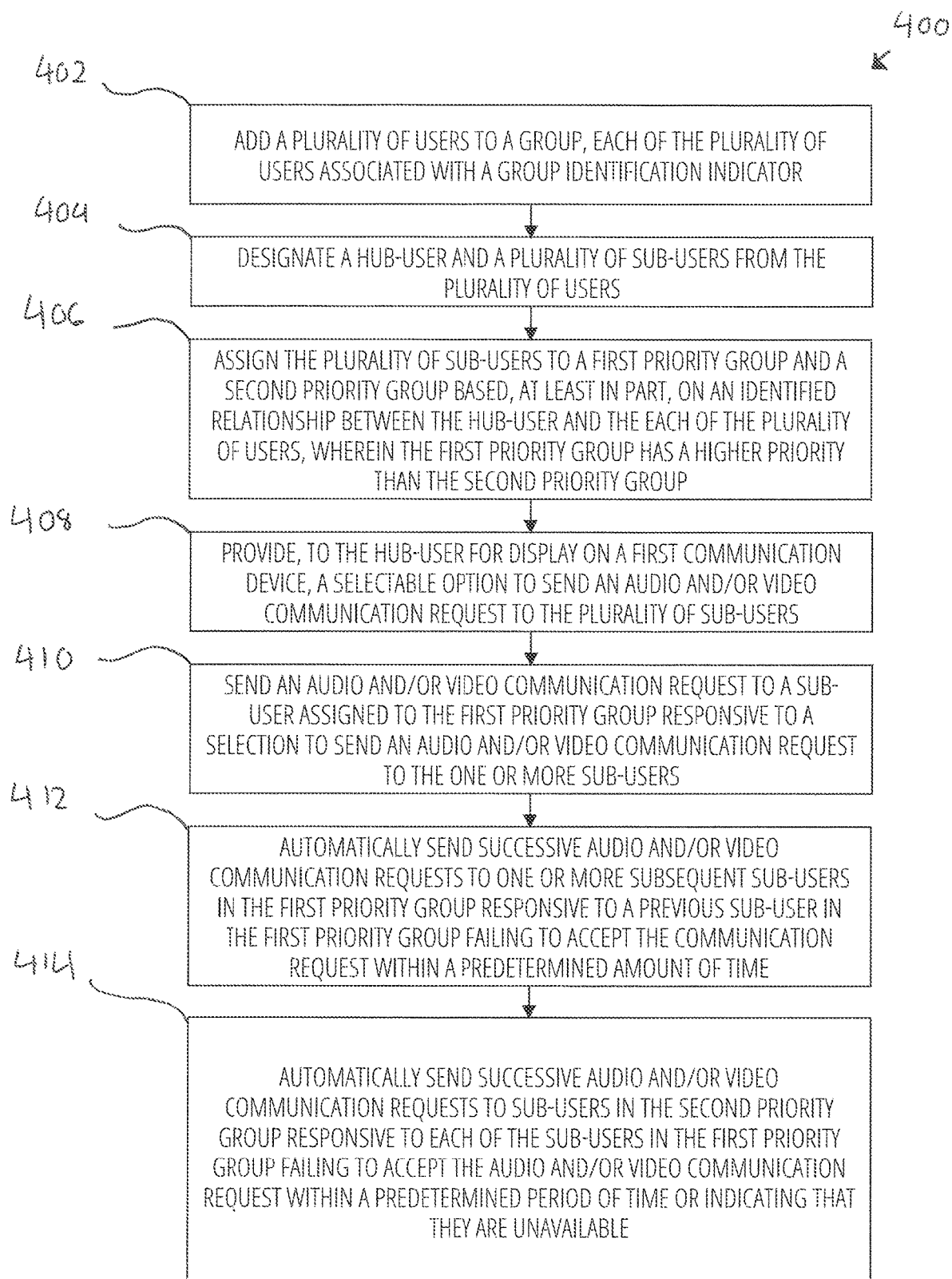
FIG. 10 is a flowchart illustrating an operation of the video conference system performed by a processor executing instructions stored on a computer-readable medium according to one or more embodiments of the present disclosure.

FIG. 4 shows an alternative GUI 260 that may be presented to a display of a communication device (e.g., hub-device 102). GUI 260 may include a selectable element 262 and a selectable list of sub-users 264. As shown in FIG. 10, the selectable list of sub-users 264 may be represented by GUI 260 as a series of card shaped elements which may be organized into any number of rows or any number of columns of card elements. Moreover, each card element of the selectable list of sub-users 264 may represent a sub-user and may display various information present in a sub-user profile. For example, each card element may contain a sub-user name, profile picture, and relationship to the hub-user. Each card element may also comprise an indication that a hub-user (e.g., hub-user 114) may select the card element to contact the sub-user represented by the corresponding card element. In some embodiments, when a hub-user selects a card element representing a sub-user via a communication device (e.g., hub-device 102), the application 104 may send an audio and/or video request to the selected sub-user.

In some embodiments, where the selectable list of sub-users 264 is too large to fit on a display of a communication device (e.g., hub-device 102), the selectable list of sub-users 264 may automatically scroll through the selectable list of sub-users 264 on the display without intervention from a user (e.g., hub-user 114). In some embodiments, a user may also manually scroll the selectable list. In this example, when manual scrolling input is detected, the automatic scrolling of the selectable list of sub-users 264 ceases and the selectable list of sub-users 264 may scroll responsive to the detected input. Moreover, when input is not detected, the selectable list of sub-users 264 may automatically begin to resume or start automatic scrolling through the selectable list of sub-users 264. With regard to selectable element 262, selectable element 262 may function substantially the same as selectable element 252 discussed above with regard to FIG. 3.

Figure 5:
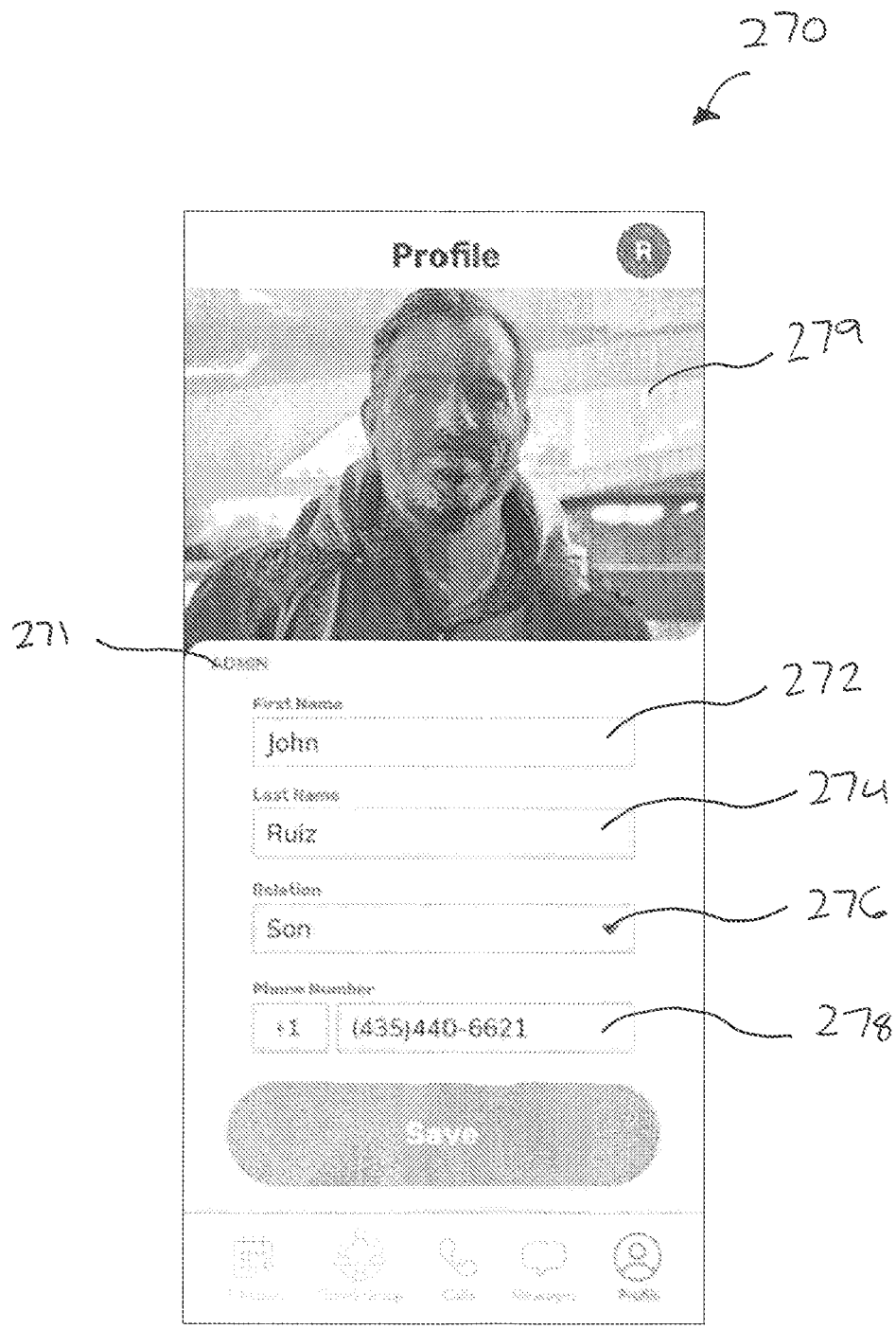
FIG. 5 illustrates a schematic representation of a graphical user interface of the video conference system for enabling a sub-user to create and edit a user profile.

FIG. 5 shows an example GUI 270 in the form of a profile page of a sub-user (e.g., sub-user 116). GUI 270 may include a profile picture 279 which may be selected and sized by the sub-user. Moreover, GUI 270 may also include editable fields including, but not limited to, first name 272, last name 274, relation 276, and phone number 278. In some embodiments, the application 104 may use the information entered into the fields 272, 274, 276, and 278 as part of the selectable list of sub-users 264 discussed above with regard to FIG. 4. Moreover, the relation field 276 may indicate the relation of the sub-user to the hub-user. Furthermore, the application 104 may use the information entered into the fields 272, 274, 276, and 278 to determine a priority group for the sub-user as well as a priority value for selection within a priority group. For example, a sub-user who has entered "child" into the relation field 276 may be placed within the highest priority group and may be assigned priority within that priority group based on information entered into the other fields such as the first name field 272. GUI 270 may also include an admin indicator 271 that indicates if a sub-user profile is admin within the group containing the hub-user and one or more sub-users. In some embodiments, a sub-user who creates the group may automatically be designated as admin for the group.

Figure 7:
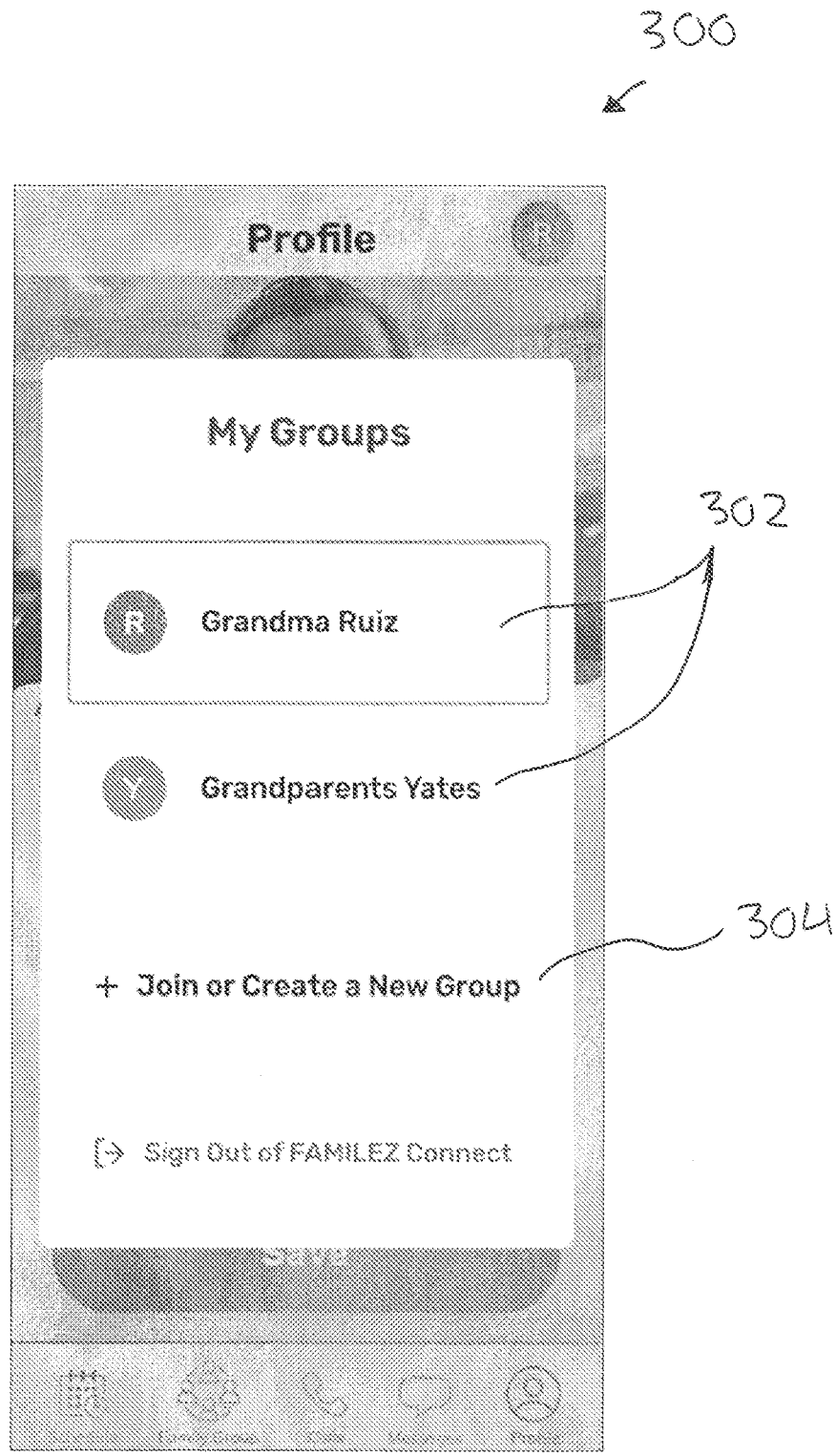
FIG. 7 illustrates a schematic representation of a graphical user interface of the video conference system for enabling a sub-user to manage one or more groups.

In some embodiments, a sub-user may be associated with more than one group. For example, FIG. 7 is a GUI 300 in the form of a group selection page for a sub-user. A sub-user may add a plurality of groups or create a new group where each group may have a designated hub-user. Accordingly, a sub-user may be associated with more than one group code such that the sub-user is able to view and interact with each group associated with the sub-user. The GUI 300 may include a list of associated groups 302 as well as a join or create new group element 304. A sub-user may select a group from the list of associated groups 302 to view information about that group (e.g., view the profiles of various sub-users associated with that group or changing settings for that group). A sub-user may also select the join or create new group element 304 where the sub-user may be prompted to enter a group code to join a group.

Figure 6:
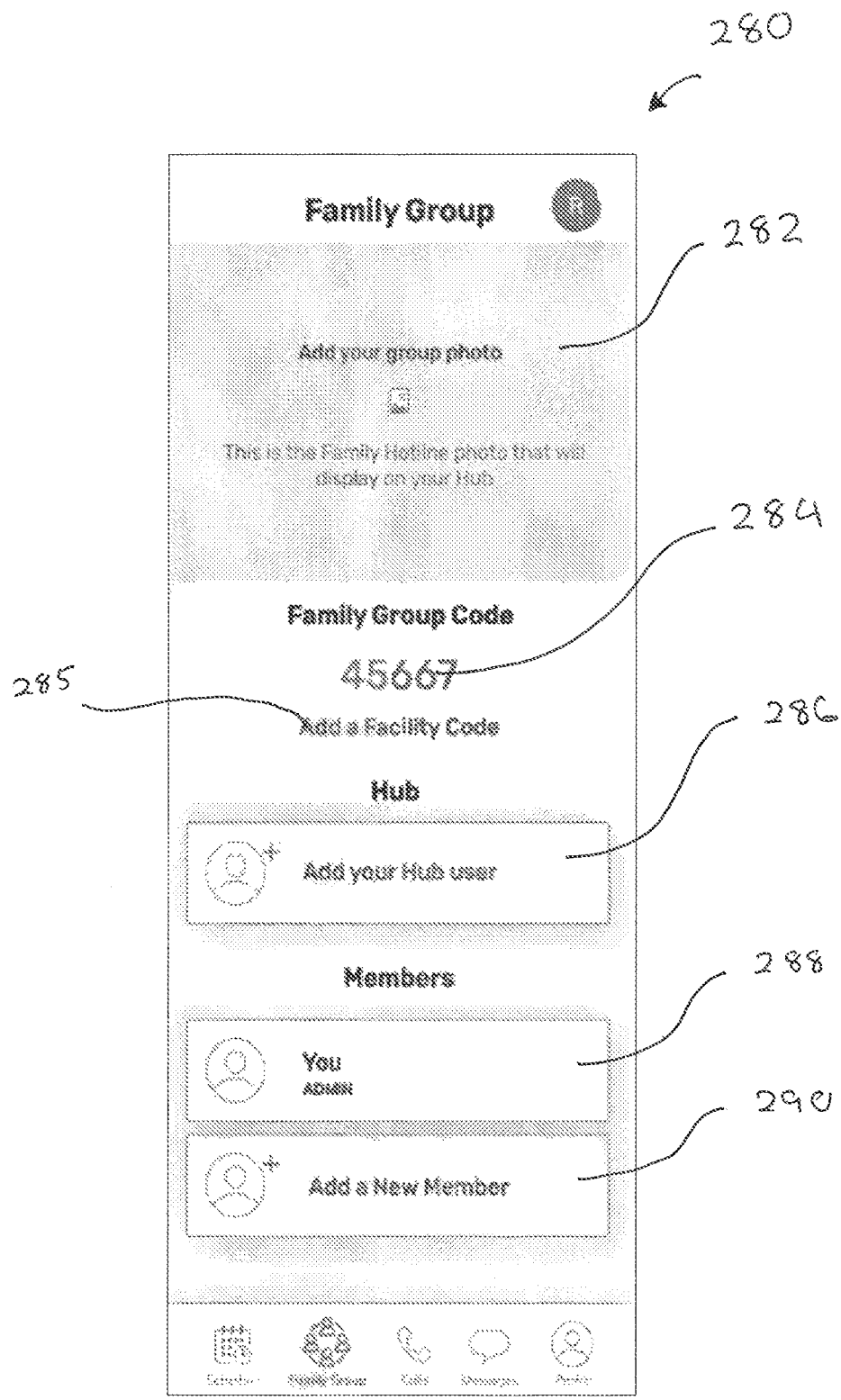
FIG. 6 illustrates a schematic representation of a graphical user interface of the video conference system for enabling a designated admin to view and change group settings.

FIG. 6 shows an example GUI 280 in the form of a family group page. In some embodiments, the family group page may only be accessible by the designated admin sub-user. GUI 280 may include a family group photo field 282, a generated group code 284, an add hub-user field 286, as well as one or more sub-user fields 288 showing current sub-users of the group and an add sub-user field 290. The group photo field 282 may be selected to add a photo viewable by all members of the group. Moreover, the photo added to the group photo field may be shown on interactive elements 252 and 262. The group code 284 is an identification code generated when the group was created that identifies the group. A sub-user may join a group manually by entering the group code generated for a particular group. The hub-user field 286 may show who the current hub-user is and/or allow a user (e.g., an admin sub-user) to designate a hub-user. In some embodiments, there is only one hub-user per group. The GUI 280 may also include one or more sub-user fields 288 showing a list of each sub-user that is a member of the group. The add sub-user field 290 may allow a group admin to send a group invite to a user not yet a member of the group. Upon accepting a group invite, a user may be designated as a sub-user of that group and be associated with the group code of that group.

The GUI 280 may also include an add facility code element 285. The add facility code element 285 may be selected to add a particular facility (e.g., an assisted living facility) to allow sub-users within the group associated with the group code to be associated within the system to the facility, which may assist in ease of communication and billing between the facility and the associated group. For example, a facility may be associated with a generated facility code that identifies a particular facility. In some embodiments, the facility may be a living facility where the hub-user is currently living.

Figure 8:
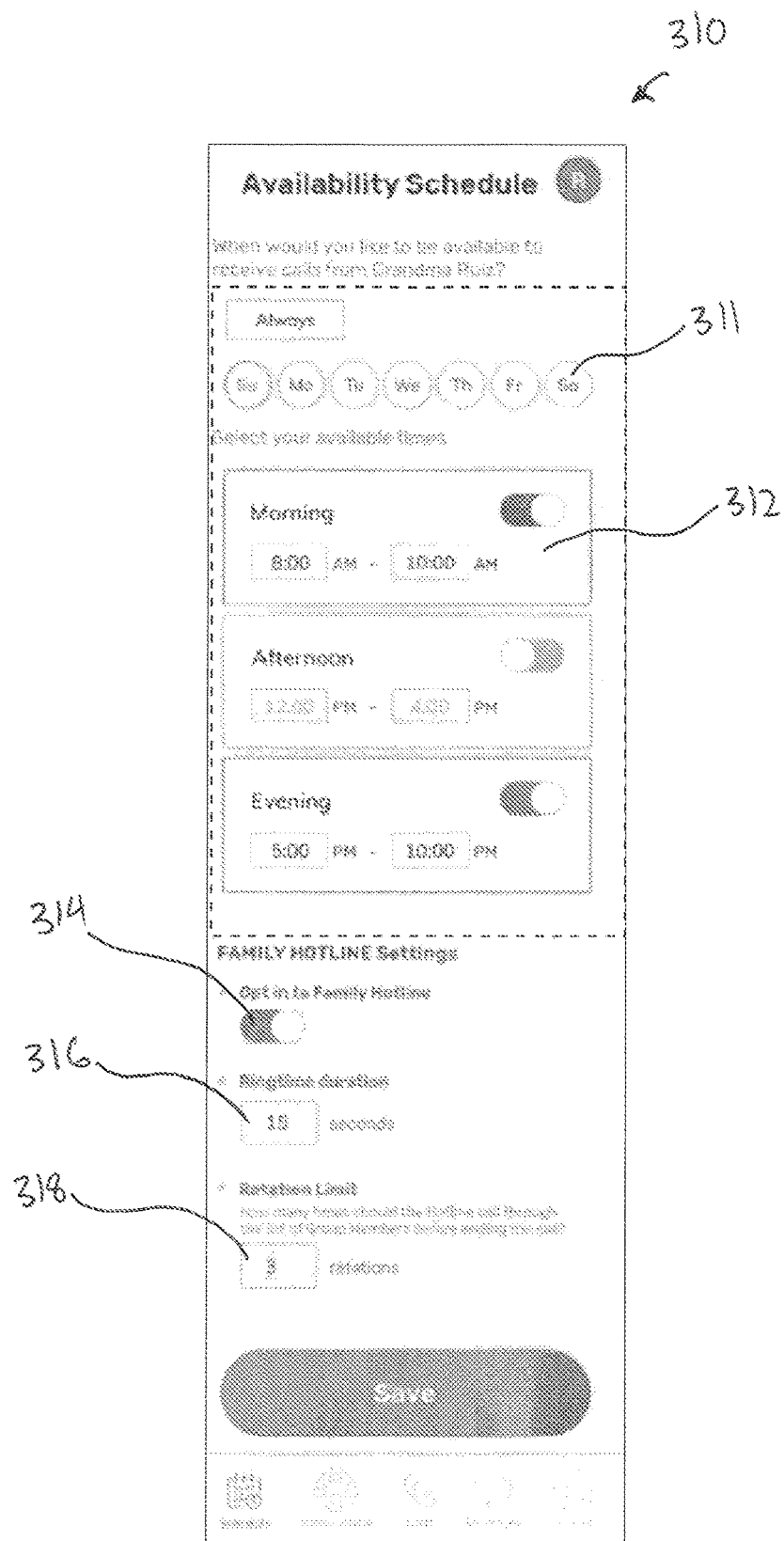
FIG. 8 illustrates a schematic representation of a graphical user interface of the video conference system for enabling a sub-user to manage one or more group-related settings.

FIG. 8 shows a GUI 310 in the form of a sub-user availability settings page. The GUI 310 may include weekly availability elements 311, daily availability elements 312, global availability element 314, ringtime duration field 316, and a rotation limit field 318. The weekly availability elements 311 may include a series of toggleable elements representing days of the week. When the toggleable elements are toggled off, the sub-user may indicate that they are unavailable during the days that the toggleable elements that represent days of the week are toggled off. Daily availability elements 312 may include fields where a sub-user may enter in the times of the day that the sub-user is available to receive a call. In some embodiments, the daily availability elements may include a series of time slots, shown in FIG. 8 representing morning, afternoon, and evening. Each time slot may have an editable field representing a range of time. Moreover, each time slot may be toggled on and off where, when the time slot is toggled off, the sub-user may indicate that they are unavailable for the time range associated with the toggled time slot. The global availability element 314 may be a toggleable element that, when toggled off, indicates that the sub-user is unavailable for communication requests from the hub user, regardless of other availability settings until toggled on. In such a case, the sub-user may be available for direct communication requests from the hub-user, depending on other availability settings. The ringtime duration field 316 allows a user to enter the amount of seconds after receiving an audio and/or video request that the request will remain active. For example, upon receiving an audio and/or video request from a hub-user or another sub-user, the request may cause the application 104 to activate a ringing jingle to be played on an audio device that is part of or operably connected to the sub-device associated with the sub-user receiving the request. The request may be active, and the ringing jingle may play, for the amount of time in seconds entered into the ringtime duration field 316. If the sub-user does not accept the request within that amount of time, then the request, and the ringing jingle, is deactivated and the sub-user may no longer be able to accept the request. The rotation limit field 318 may allow a sub-user to enter in the amount of times a hub-user may cycle through all of the available sub-users when sending audio and/or video requests. In some embodiments, the rotation limit field 318 is only available to sub-users who are designated as admins.

Figure 9:
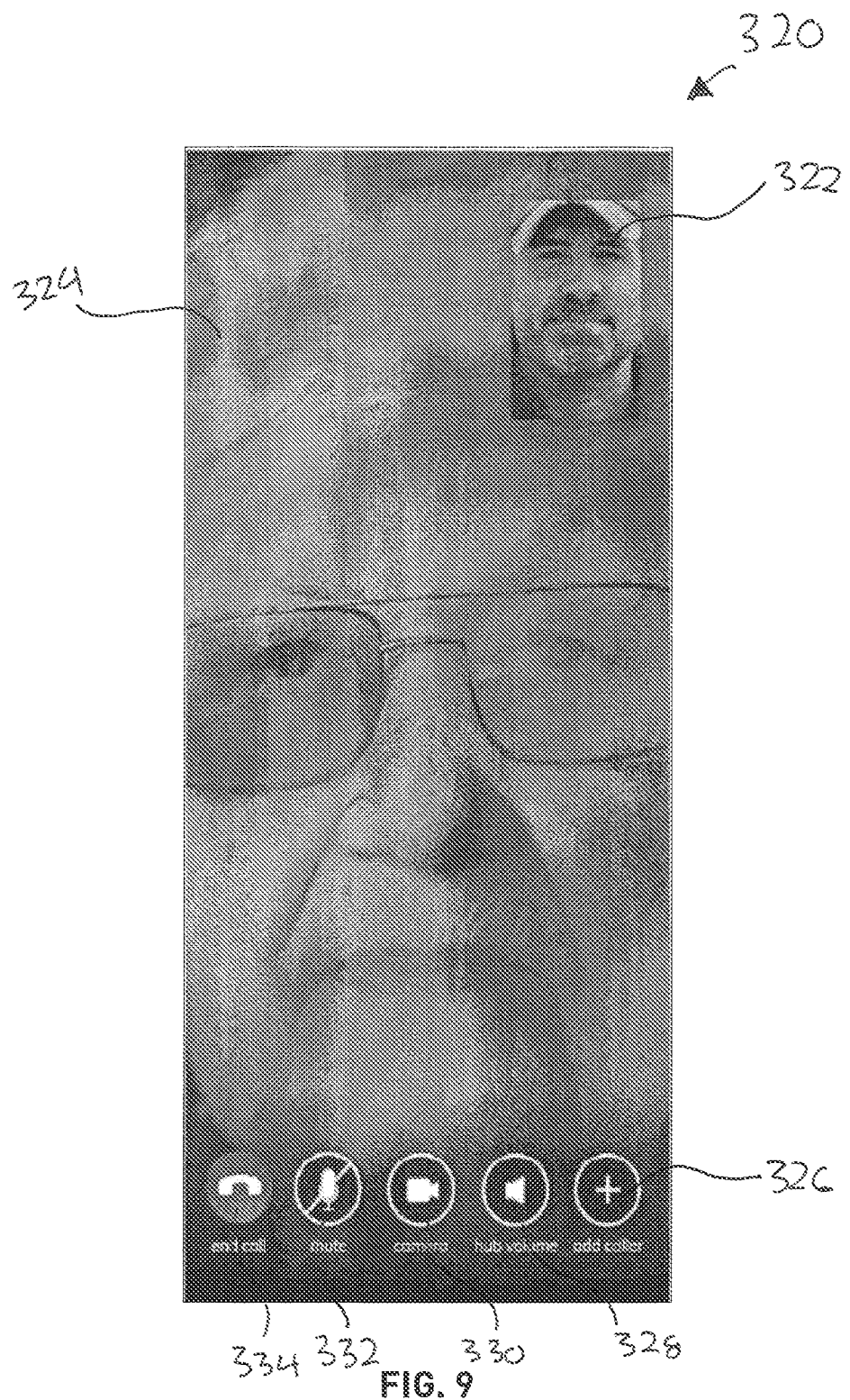
FIG. 9 illustrates a schematic representation of a graphical user interface of the video conference system for enabling audio and/or video communication between a hub-user and a sub-user.

FIG. 9 shows a GUI 320 displayed on a display of a sub-device (e.g., sub-device 108) that is in audio and/or video connection with a hub-device (e.g., hub-device 102). The GUI 320 may include a sub-user video viewport 322, a hub-user video viewport 324, an add caller selectable element 326, a hub volume selectable element 328, a camera selectable element 330 a mute selectable element 332, and an end call selectable element 334.

The sub-user video viewport 322 may display a video stream representative of video signals being sent from the sub-device to a hub-device while in video communication with the hub-device. For example, the video signals may be a live video feed of a video device that is part of or operably connected to the sub-device. In some embodiments, when the video device of the sub-device is disabled, the sub-user video viewport 322 may display the profile picture associated with the sub-user that is using the sub-device. The hub-user video viewport 324 may display a video stream representative of video signals being sent from the hub-device to the sub-device. For example, the video signals may be a live video feed of a video device that is part of or operably coupled to the hub-device. In some embodiments, when the video device of the hub-device is disabled, the hub-user viewport 324 may display a profile picture associated with the hub-user.

The add caller selectable element 326 may enable a sub-user to invite one or more other sub-users to the video conference session between the sub-user and the hub-user. For example, upon selection of the add caller selectable element 326, the sub-user may be presented with a list of all available sub-users that are part of the group to which the hub-user belongs. The sub-user may then select one or more other sub-users from the list of available sub-users. The video conference system 100 may then send an audio and/or video request message to the selected available sub-users. One or more of the selected available sub-users may then join the current video conference session responsive to one or more of the selected available sub-users accepting the request.

The hub volume selectable element 328 may allow a sub-user to remotely control the volume of an audio device (e.g., an audio speaker) that is part of or operably connected to a hub-device. For example, when the hub-device 102 is in audio and/or video connection with sub-device 108, sub-user 116 may select the hub volume selectable element 328 to adjust the volume of an audio device operably connected to or part of the hub-device 102 by sending one or more control signals over network 106 from the sub-device 108 to the hub-device 102.

The camera selectable element 330 may allow a sub-user to control a video device that is part of or operably connected to the sub-device. In some embodiments, the GUI 320 may also include a hub camera selectable element that may allow a sub-user to remotely control various video settings of a video device that is part of or operably connected to a hub-device. For example, when the hub-device 102 is in audio and/or video communication with sub-device 108, sub-user 116 may select the hub video selectable element to adjust one or more settings of a video device that is part of or operably connected to the hub-device 102 by sending one or more control signals over network 106 from the sub-device 108 to the hub-device 102.

The mute selectable element 332 may allow a sub-user to mute a microphone that is part of or operably connected to the sub-device. The end call selectable element 334 would allow a sub-user to terminate audio and/or video communication with a hub-user.

FIG. 10 is a flowchart illustrating an operation of the video conference system 100 performed by a processor executing instructions stored on a computer-readable storage medium. At operation 402, the video conference system 100 may add a plurality of users to a group where each of the plurality of users is associated with a group identification indicator (e.g., a group identification code). At operation 404, the video conference system 100 may designate a hub-user and a plurality of sub-users from the plurality of users. At operation 406, the video conference system 100 may assign the plurality of sub-users to a first priority group and a second priority group based, at least in part, on an identified relationship between the hub-user and each of the plurality of users, wherein the first priority group has a higher priority than the second priority group.

At operation 408, the video conference system 100 may provide, to the hub-user for display on a first communication device, a selectable option to send an audio and/or video communication request to the plurality of sub-users. At operation 410, the video conference system 100 may send an audio and/or video communication request to a sub-user assigned to the first priority group responsive to a selection to send an audio and/or video communication request to the one or more sub-users. At operation 412, the video conference system 100 may automatically send successive audio and/or video communication requests to one or more subsequent sub-users in the first priority group responsive to a previous sub-user in the first priority group failing to accept the communication request within a predetermined amount of time. At operation 414, the video conference system 100 may automatically send successive audio and/or video communication requests to sub-users in the second priority group responsive to each of the sub-users in the first priority group failing to accept the audio and/or video communication request within a predetermined period of time or indicating that they are unavailable.

Figure 11:
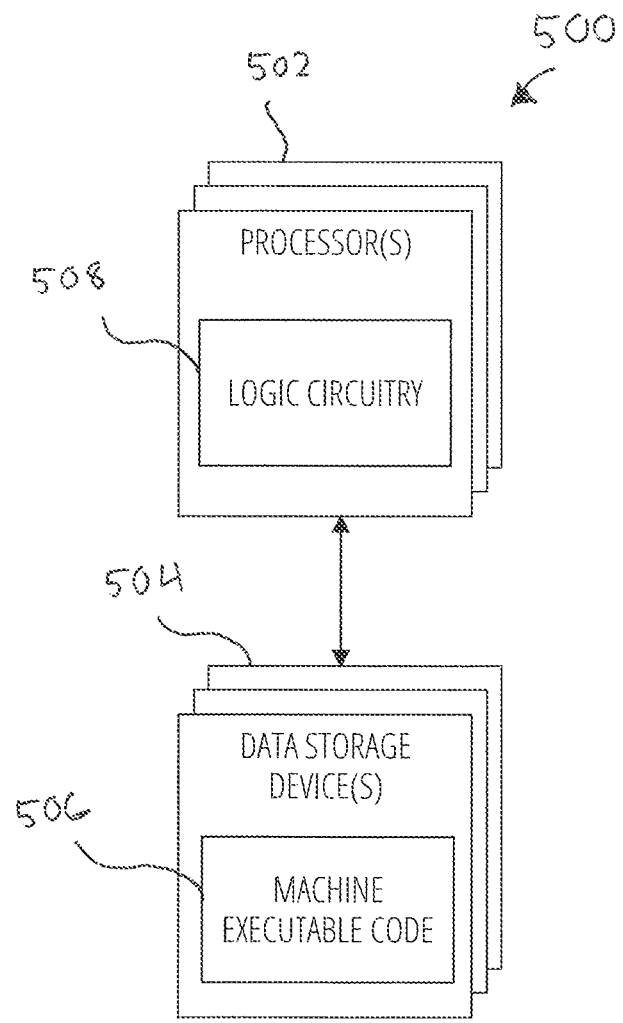
FIG. 11 is a block diagram of circuitry that, in some examples, may be used to implement various functions, operations, acts, processes, and/or methods disclosed herein.

FIG. 11 is a block diagram of circuitry 500 that, in some examples, may be used to implement various functions, operations, acts, processes, and/or methods disclosed herein. The circuitry 500 includes one or more processors 502 (sometimes referred to herein as "processors 502") operably coupled to one or more data storage devices (sometimes referred to herein as "storage 504"). The storage 504 includes machine executable code 506 stored thereon and the processors 502 include logic circuitry 508. The machine executable code 506 includes information describing functional elements that may be implemented by (e.g., performed by) the logic circuitry 508. The logic circuitry 508 is adapted to implement (e.g., perform) the functional elements described by the machine executable code 506. The circuitry 500, when executing the functional elements described by the machine executable code 506, should be considered as special purpose hardware configured for carrying out functional elements disclosed herein. In some examples, the processors 502 may perform the functional elements described by the machine executable code 506 sequentially, concurrently (e.g., on one or more different hardware platforms), or in one or more parallel process streams.

When implemented by logic circuitry 508 of the processors 502, the machine executable code 506 is to adapt the processors 502 to perform operations of examples disclosed herein. For example, the machine executable code 506 may adapt the processors 502 to perform at least a portion or a totality of the operation 200 of FIG. 2 and/or the operation 400 of FIG. 10. As another example, the machine executable code 506 may adapt the processors 502 to perform at least a portion or a totality of the operations discussed for the system of FIG. 1. As a specific, non-limiting example, the machine executable code 506 may adapt the processors 502 to provide to a hub-user for display on a first communication device, a selectable option to send an audio and/or video communication request to the one or more sub-users. As another specific, non-limiting example, the machine executable code 506 may adapt the processors 502 to send an audio and/or video communication request to a sub-user of one or more sub-users responsive to a selection to send an audio and/or video communication request to the one or more sub-users.

The processors 502 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer executes functional elements corresponding to the machine executable code 506 (e.g., software code, firmware code, hardware descriptions) related to examples of the present disclosure. It is noted that a general-purpose processor (may also be referred to herein as a host processor or simply a host) may be a microprocessor, but in the alternative, the processors 502 may include any conventional processor, controller, microcontroller, or state machine. The processors 502 may also be implemented as a combination of computing devices, such as a combination of a DSP and a microprocessor, a plurality of microprocessors, one or more microprocessors in conjunction with a DSP core, or any other such configuration.

In some examples, the storage 504 includes volatile data storage (e.g., random-access memory (RAM)), non-volatile data storage (e.g., Flash memory, a hard disc drive, a solid state drive, erasable programmable read-only memory (EPROM), etc.). In some examples, the processors 502 and the storage 504 may be implemented into a single device (e.g., a semiconductor device product, a system on chip (SOC), etc.). In some examples, the processors 502 and the storage 504 may be implemented into separate devices.

In some examples, the machine executable code 506 may include computer-readable instructions (e.g., software code, firmware code). By way of non-limiting example, the computer-readable instructions may be stored by the storage 504, accessed directly by the processors 502, and executed by the processors 502 using at least the logic circuitry 508. Also by way of non-limiting example, the computer-readable instructions may be stored on the storage 504, transferred to a memory device (not shown) for execution, and executed by the processors 502 using at least the logic circuitry 508. Accordingly, in some examples the logic circuitry 508 includes electrically configurable logic circuitry 508.

In some examples, the machine executable code 506 may describe hardware (e.g., circuitry) to be implemented in the logic circuitry 508 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, VERILOG™, SYSTEMVERILOG™ or very large scale integration (VLSI) hardware description language (VHDL™) may be used.

HDL descriptions may be converted into descriptions at any of numerous other levels of abstraction as desired. As a non-limiting example, a high-level description may be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 508 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples, the machine executable code 506 may include an HDL, an RTL, a GL description, a mask level description, other hardware description, or any combination thereof.

In examples where the machine executable code 506 includes a hardware description (at any level of abstraction), a system (not shown, but including the storage 504) may implement the hardware description described by the machine executable code 506. By way of non-limiting example, the processors 502 may include a programmable logic device (e.g., an FPGA or a PLC) and the logic circuitry 508 may be electrically controlled to implement circuitry corresponding to the hardware description into the logic circuitry 508. Also by way of non-limiting example, the logic circuitry 508 may include hard-wired logic manufactured by a manufacturing system (not shown, but including the storage 504) according to the hardware description of the machine executable code 506.

Regardless of whether the machine executable code 506 includes computer-readable instructions or a hardware description, the logic circuitry 508 is adapted to perform the functional elements described by the machine executable code 506 when implementing the functional elements of the machine executable code 506. It is noted that although a hardware description may not directly describe functional elements, a hardware description indirectly describes functional elements that the hardware elements described by the hardware description are capable of performing.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

The invention claimed is:

1. A method comprising:
adding a plurality of users to a group, each of the plurality of users associated with a group identification indicator;
designating a hub-user and one or more sub-users from the plurality of users;
automatically assigning the one or more sub-users to one or more priority groups based, at least in part, on an identified familial relationship between the hub-user and the one or more sub-users;
providing, to the hub-user for display on a first communication device, a selectable option to send an audio and/or video communication request to the one or more sub-users; and
sending an audio and/or video communication request to a sub-user of the one or more sub-users responsive to a selection to send an audio and/or video communication request to the one or more sub-users,
wherein the sub-user is automatically selected to receive the audio and/or video communication request based, at least in part, on the assigned priority group of the sub-user and an indication that the sub-user is available to receive the communication.

2. The method of claim 1, further comprising:
providing, to the sub-user for display on a second communication device, a selectable option to accept the audio and/or video communication request from the hub-user; and
initiating audio and/or video communication between the hub-user and the selected sub-user responsive to the selected sub-user accepting the communication request.

3. The method of claim 2, further comprising:
sending a join request to one or more other sub-users different from the selected sub-user; and
initiating audio and/or video communication between the hub-user, the selected sub-user, and the one or more other sub-users responsive to the one or more other sub-users accepting the join request.

4. The method of claim 1 wherein the one or more sub-users comprises a plurality of sub-users, the method further comprising:
automatically sending an audio and/or video communication request to a subsequent sub-user of the plurality of sub-users responsive to failing to connect to a previously selected sub-user, the subsequent sub-user of the plurality of sub-users selected based, at least in part, on the assigned priority group of the subsequent sub-user and an indication that the subsequent sub-user is available to receive the communication.

5. The method of claim 1, further comprising providing, to a user display on the first communication device a selectable list of the one or more sub-users.

6. The method of claim 5 wherein the selectable list comprises one or more sub-users having an indication that the sub-user is available to receive a communication.

7. The method of claim 1, wherein initiating audio and/or video communication between the hub-user and the selected sub-user comprises:
enabling a first audio communication device operably connected to the first communication device and enabling a second audio communication device operably connected to a second communication device, and
enabling a first video communication device operably connected to the second communication device but not enabling a second video communication device operably connected to the first communication device.

8. The method of claim 7, wherein the audio communication device comprises a microphone and the video communication device comprises a video camera.

9. The method of claim 1, wherein the group identification indicator is a group identification code.

10. The method of claim 1, further comprising changing one or more audio and/or video settings of the first communication device responsive to input received from a remote second computational device.

11. The method of claim 1, further comprising designating one or more admin users from the plurality of added users.

12. A system comprising:
at least one processor;
at least one non-transitory computer-readable storage medium storing instructions thereon that, when executed by the at least one processor, cause the system to:
add a plurality of users to a group, each of the plurality of users associated with a group identification indicator;
designate a hub-user and a plurality of sub-users from the plurality of users;
assign the plurality of sub-users to a first priority group and a second priority group based, at least in part, on an identified relationship between the hub-user and each of the plurality of sub-users, wherein the first priority group has a higher priority than the second priority group;

provide, to the hub-user for display on a first communication device, a selectable option to send an audio and/or video communication request to the plurality of sub-users;

send an audio and/or video communication request to a sub-user assigned to the first priority group responsive to a selection to send an audio and/or video communication request to the plurality sub-users;

automatically send successive audio and/or video communication requests to one or more subsequent sub-users in the first priority group responsive to a previous sub-user in the first priority group failing to accept the communication request within a predetermined period of time; and automatically send successive audio and/or video communication requests to sub-users in the second priority group responsive to each of the sub-users in the first priority group failing to accept the audio and/or video communication request within a predetermined period of time or indicating that they are unavailable.

13. The system of claim 12, wherein each sub-user within a respective priority group is selected randomly within the respective priority group.

14. The system of claim 12, wherein each sub-user within a respective priority group is selected according to a predetermined ordering.

15. The system of claim 12, further comprising automatically sending successive audio and/or video communication requests to additional priority groups responsive to each of the sub-users in the first and second priority groups failing to accept the audio and/or video communication request within a predetermined period of time or indicating that they are unavailable.

16. A non-transitory computer-readable medium storing instructions thereon that, when executed by at least one processor, cause the at least one processor to perform the steps comprising:

adding a plurality of users to a group, each of the plurality of users associated with a group identification indicator;

designating a hub-user and one or more sub-users from the plurality of users;

automatically assigning the one or more sub-users to one or more priority groups based, at least in part, on an identified familial relationship between the hub-user and the one or more sub-users;

providing, to the hub-user for display on a first communication device, a selectable option to send an audio and/or video communication request to the one or more sub-users; and sending an audio and/or video communication request to a sub-user of the one or more sub-users responsive to a selection to send an audio and/or video communication request to the one or more sub-users, wherein the sub-user is automatically selected to receive the communication request based, at least in part, on the assigned priority group of the sub-user and an indication that the sub-user is available to receive the communication.

17. The non-transitory computer-readable medium of claim 16, wherein the one or more sub-users comprises a plurality of sub-users, further comprising:

automatically sending an audio and/or video communication request to a subsequent sub-user of the plurality of sub-users responsive to failing to connect to a previously selected sub-user.

18. The non-transitory computer-readable medium of claim 17, wherein the subsequent sub-user of the plurality of sub-users is selected based, at least partially, on a predetermined selection order.

19. The non-transitory computer-readable medium of claim 16, further comprising providing, to a user display on the first communication device, a selectable list of the one or more sub-users.

20. The non-transitory computer-readable medium of claim 16, further comprising changing one or more audio and/or video settings of the first communication device responsive to input received from a remote second computational device.

* * * * *